(12) United States Patent
Brahma et al.

(10) Patent No.: US 11,586,865 B2
(45) Date of Patent: Feb. 21, 2023

(54) APPARATUS, SYSTEM AND METHOD FOR FUSING SENSOR DATA TO DO SENSOR TRANSLATION

(71) Applicant: VOLKSWAGEN AKTIENGESELLSCHAFT, Wolfsburg (DE)

(72) Inventors: Pratik Prabhanjan Brahma, Belmont, CA (US); Nasim Souly, San Mateo, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 241 days.

(21) Appl. No.: 17/179,205

(22) Filed: Feb. 18, 2021

(65) Prior Publication Data

US 2022/0261590 A1    Aug. 18, 2022

(51) Int. Cl.
*G06K 9/62* (2022.01)
*G06T 7/50* (2017.01)
*G01S 17/931* (2020.01)
*G01B 11/22* (2006.01)
*G01S 17/89* (2020.01)

(52) U.S. Cl.
CPC .............. *G06K 9/629* (2013.01); *G01B 11/22* (2013.01); *G01S 17/89* (2013.01); *G01S 17/931* (2020.01); *G06K 9/6256* (2013.01); *G06K 9/6263* (2013.01); *G06K 9/6289* (2013.01); *G06T 7/50* (2017.01); *G06T 2207/10028* (2013.01);

(Continued)

(58) Field of Classification Search
CPC .. G06V 20/582; G06V 20/588; G06V 20/584; G06K 9/6267
See application file for complete search history.

(56) References Cited

U.S. PATENT DOCUMENTS 9,977,430 B2 * 5/2018 Shalev-Shwartz ... G05D 1/0088
10,248,124 B2 * 4/2019 Bellaiche .............. B60W 10/20
(Continued)

FOREIGN PATENT DOCUMENTS

KR     102168753 B1    10/2020
WO    2019195363 A1    10/2019

OTHER PUBLICATIONS

PCT/EP2022052528. International Search Report (dated May 19, 2022).
(Continued)

*Primary Examiner* — Yosef Kassa
(74) *Attorney, Agent, or Firm* — Loza & Loza, LLP; Peter Zura

(57) ABSTRACT

Technologies and techniques for operating a sensor system including an image sensor and a light detection and ranging (LiDAR) sensor. Image data associated with an image scene of a landscape is received from the image sensor, and LiDAR data associated with a LiDAR scene of the landscape is received from the LiDAR sensor, wherein the LiDAR scene and image scene of the landscape substantially overlap. A machine-learning model is applied to (i) the image data to identify image points of interest in the image data, and (ii) the LiDAR data to identify LiDAR features of interest in the LiDAR data. The LiDAR features of interest and the image points of interest are fused, utilizing an attention mechanism, and generating an output, wherein new LiDAR data is produced, based on the fusing output.

20 Claims, 9 Drawing Sheets

(52) U.S. Cl.
CPC .............. *G06T 2207/20081* (2013.01); *G06T 2207/20084* (2013.01)

(56) References Cited

U.S. PATENT DOCUMENTS

| | | | |
|---|---|---|---|
| 10,360,477 B2* | 7/2019 | Bhaskar | G06K 9/6256 |
| 10,424,072 B2* | 9/2019 | Wang | G06K 9/6244 |
| 10,649,462 B2* | 5/2020 | Shalev-Shwartz ... | G05D 1/0231 |
| 10,795,375 B2* | 10/2020 | Shalev-Shwartz ... | G05D 1/0231 |
| 2019/0004534 A1 | 1/2019 | Huang et al. | |
| 2019/0004535 A1 | 1/2019 | Huang et al. | |
| 2019/0197667 A1 | 6/2019 | Paluri | |

OTHER PUBLICATIONS

Yu et al. "Pu-net: Point cloud upsampling network." Proceedings of the IEEE Conference on Computer Vision and Pattern Recognition (CVPR) pp. 2790-2799 (2018).

LI et al. "PU-GAN: a Point Cloud Upsampling Adversarial Network." Proceedings of the IEEE/CVF International Conference on Computer Vision (ICCV) pp. 7203-7212 (2019).

Qiu et al. "Deeplidar: Deep surface normal guided depth prediction for outdoor scene from sparse lidar data and single color image." Proceedings of the IEEE/CVF Conference on Computer Vision and Pattern Recognition (CVPR), pp. 3313-3322 (2019).

Chen et al. "Learning joint 2D-3D representations for depth completion." Proceedings of the IEEE/CVF International Conference on Computer Vision (ICCV) pp. 10023-10032 (2019).

Wu et al. "Point Cloud Super Resolution with Adversarial Residual Graph Networks." arXiv preprint arXiv:1908.02111 (2019).

Isola et al. "Image-to-image translation with conditional adversarial networks." Proceedings of the IEEE Conference on Computer Vision and Pattern Recognition (CVPR) pp. 1125-1134 (2017).

Liu et al. "Unsupervised image-to-image translation networks." 31st Conf. on Neural Information Processing Systems (NIPS), Long Beach, CA (2017).

Cherian et al. "Sem-GAN: semantically-consistent image-to-image translation." IEEE Winter Conference on Applications of Computer Vision (WACV), Waikoloa, HI, USA, 2019, pp. 1797-1806, doi: 10.1109/WACV.2019.00196 (2019).

Pandey. "An information theoretic framework for camera and lidar sensor data fusion and its applications in autonomous navigation of vehicles." Thesis, A dissertation submitted in partial fulfillment of the requirements for the degree of Doctor of Philosophy (Electrical Engineering—Systems) University of Michigan (2014).

Dou et al. "Asymmetric cyclegan for unpaired NIR-to-RGB face image translation." IEEE International Conference an Acoustics, Speech and Signal Processing (ICASSP), Brighton, UK pp. 1757-1761 (2019).

Kim et al. "Color Image Generation from LiDAR Reflection Data by Using Selected Connection UNET." Sensors 20, 3387 (2020).

Kaji et al. "Overview of image-to-image translation using deep neural networks: denoising, super-resolution, modality-conversion, and reconstruction in medical imaging." researchgate.net (May 21, 2019).

Vaswani et al. "Attention is all you need." 31st Conference on Neural Information Processing Systems (NIPS), Long Beach, CA (2017).

Kim et al. "Asymmetric Encoder-Decoder Structured FCN Based LiDAR to Color Image Generation." Sensors 2019, 19, 4818.

Zhou et al. "Graph Neural Networks:A Review of Methods and Applications." arXiv.org > cs > arXiv:1812.08434 (Jul. 10, 2019).

\* cited by examiner

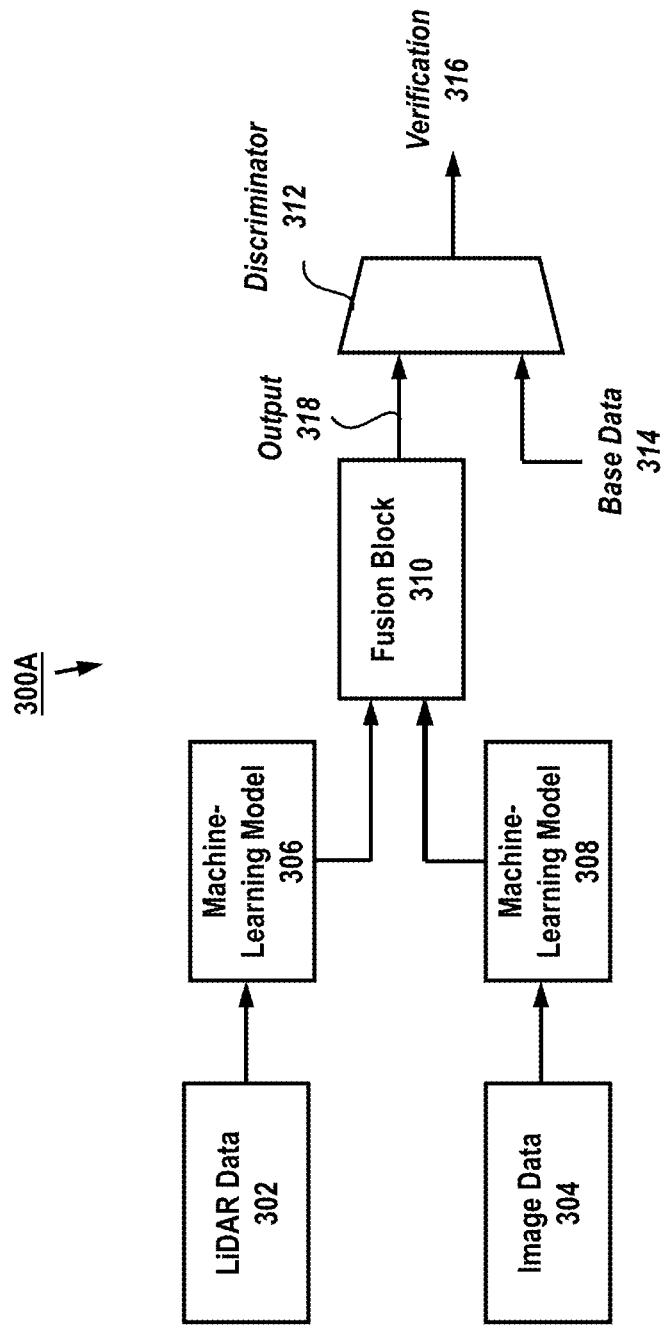

APPARATUS, SYSTEM AND METHOD FOR FUSING SENSOR DATA TO DO SENSOR TRANSLATION

TECHNICAL FIELD

The present disclosure relates to processing and fusing sensor data from two different types of sensors. More specifically, the present disclosure relates to technologies and techniques for processing and fusing sensor data from two different types of sensor utilizing machine learning algorithms.

BACKGROUND

Numerous devices and systems are configured today to utilize multiple sensors. In the case of autonomous vehicles, the ability to navigate a vehicle is dependent upon having accurate and precise sensor data, in order to operate in a safe and reliable manner. Many of today's autonomous vehicles are typically equipped with different sensor suites and are calibrated to suit the specific application of the vehicle. During the course of operation, autonomous vehicles will typically require sensor upgrading and/or replacement in order to maintain the vehicle's operational capacity.

One of the issues experienced during sensor replacement and/or upgrade is coordinating the operation of the new or upgraded sensor(s) with the existing autonomous vehicle system. Currently, light detection and ranging (sometimes referred to as active laser scanning), or LiDAR sensors have experienced large growth in the industry. Each LiDAR sensor is typically configured with different physical properties, based on the type of photon emitted, scanning patterns, transmitter-receiver characteristic, and so on. In order to replace one LiDAR with another, machine learning techniques (generally known as "artificial intelligence", or "AI") are used for the existing vehicle system to "learn" the properties of the new LiDAR. In order for a machine-learning model to be able to transfer data from one sensor (e.g., LiDAR) to another, the model has to understand the properties of each sensor, as well as the structure of the objects visible in a point cloud to resolutions in multiple scales. In most cases, this learning process is excessively time-consuming and often expensive to implement.

In cases where sensors are being upgraded, for example, from a low-resolution sensor to a higher resolution sensor, machine-learning algorithms such as deep neural networks have been used to estimate denser data from lower-resolution (sparse) data. However, such techniques typically rely only on point cloud data, and/or are configured to consume only three-dimensional (3D) volumes as inputs, or output shapes in voxel representations, which is inefficient.

SUMMARY

Various apparatus, systems and methods are disclosed herein relating to controlling and/or modifying operation of vehicle sensors.

In some illustrative embodiments, a method is disclosed of operating a sensor system comprising an image sensor and a light detection and ranging (LiDAR) sensor, the method comprising receiving image data from the image sensor associated with an image scene of a landscape; receiving LiDAR data from the LiDAR sensor associated with a LiDAR scene of the landscape, wherein the LiDAR scene and image scene of the landscape overlap; applying one or more machine-learning models to (i) the image data to identify image features of interest, and to (ii) the LiDAR data to identify LiDAR features of interest; fusing features of the LiDAR features of interest and the image features of interest; and generating LiDAR data based on the fused features, wherein the generated LiDAR data has a depth map and a LiDAR location mask representative of the landscape.

In some illustrative embodiments, a sensor system is disclosed comprising an image sensor and a light detection and ranging (LiDAR) sensor, the system comprising a first input for receiving image data from the image sensor associated with an image scene of a landscape; a second input for receiving LiDAR data from the LiDAR sensor associated with a LiDAR scene of the landscape, wherein the LiDAR scene and image scene of the landscape overlap; a memory, coupled to the input for storing the first sensor data; and a processor, operatively coupled to the memory, wherein the processor and memory are configured to apply one or more machine-learning models to (i) the image data to identify image features of interest, and to (ii) the LiDAR data to identify LiDAR features of interest; fuse features of the LiDAR features of interest and the image features of interest; and generate LiDAR data based on the fused features, wherein the generated LiDAR data has a depth map and a LiDAR location mask representative of the landscape.

In some illustrative embodiments, a method of operating a sensor system comprising an image sensor and a light detection and ranging (LiDAR) sensor is disclosed, comprising receiving image data from the image sensor associated with an image scene of a landscape; receiving LiDAR data from the LiDAR sensor associated with a LiDAR scene of the landscape, wherein the LiDAR scene and image scene of the landscape overlap; applying one or more machine-learning models to (i) the image data to identify image features of interest in the image data, and (ii) the LiDAR data to identify LiDAR features of interest in the LiDAR data; fusing the LiDAR features of interest and the image points of interest, utilizing an attention mechanism, and generating an output; and generating new LiDAR data based on the fusing output, wherein the generated new LiDAR data comprises a depth map and a LiDAR location mask representative of the landscape.

BRIEF DESCRIPTION OF THE FIGURES

The present invention is illustrated by way of example and not limitation in the figures of the accompanying drawings, in which like references indicate similar elements and in which:

FIG. 3A shows an exemplary block diagram for applying machine learning models to LiDAR data and image data and fusing the results according to some aspects of the present disclosure;

DETAILED DESCRIPTION

Figure 1:
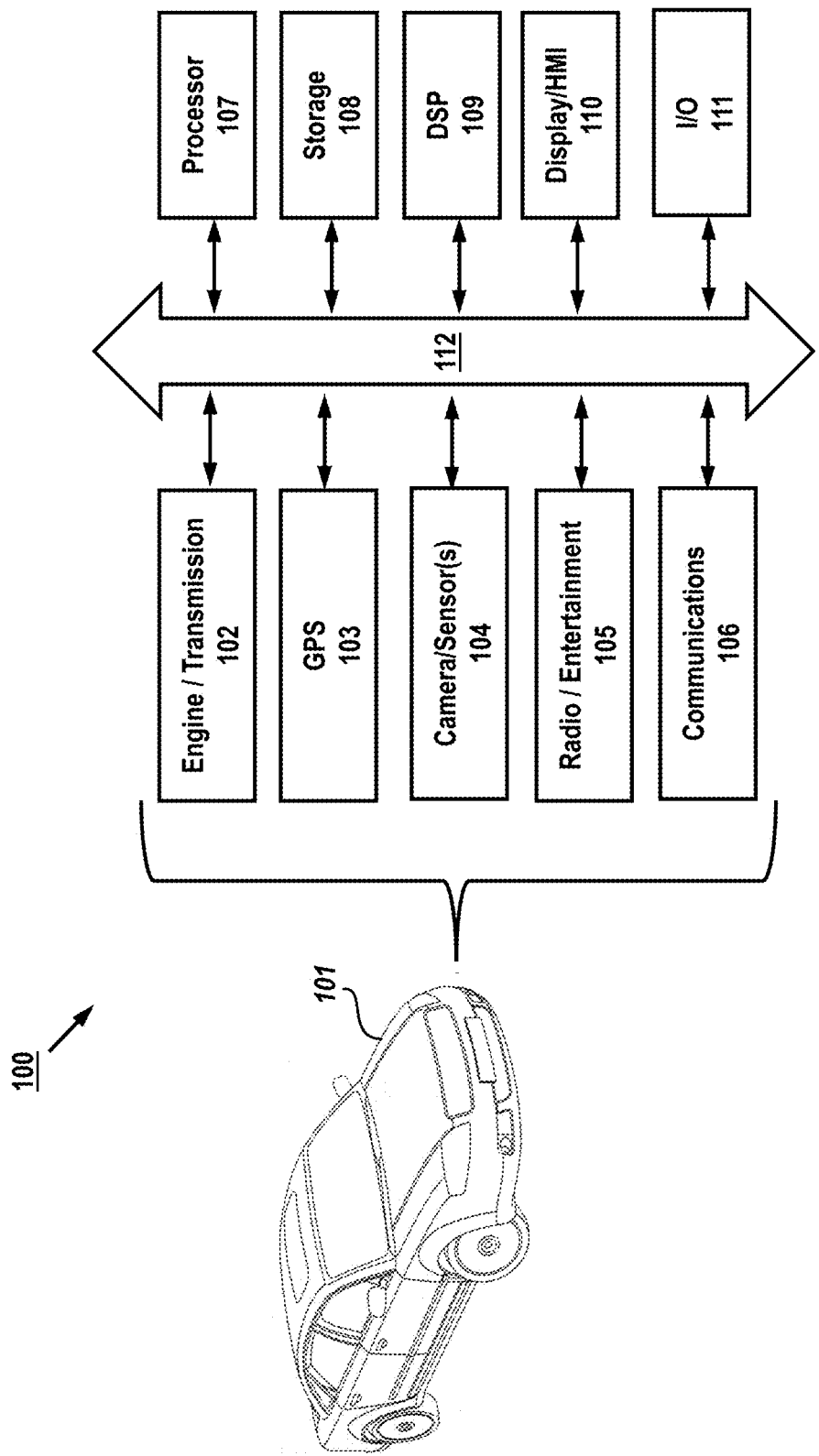
FIG. 1 shows an exemplary vehicle system block diagram showing multiple components and modules according to some aspects of the present disclosure.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of tangibly-embodied software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via Scalable Language ("Scala"), C, C++, C#, Java, Actionscript, Objective-C, Javascript, CSS, XML, etc.).

Turning to FIG. 1, the drawing illustrates an exemplary system 100 for a vehicle 101 comprising various vehicle electronics circuitries, subsystems and/or components. Engine/transmission circuitry 102 is configured to process and provide vehicle engine and transmission characteristic or parameter data, and may comprise an engine control unit (ECU), and a transmission control. For a diesel engine, circuitry 102 may provide data relating to fuel injection rate, emission control, NOx control, regeneration of oxidation catalytic converter, turbocharger control, cooling system control, and throttle control, among others. For a gasoline and/or hybrid engine, circuitry 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals for any of gasoline, hybrid and/or electrical engines.

Global positioning system (GPS) circuitry 103 provides navigation processing and location data for the vehicle 101. The camera/sensors 104 provide image or video data (with or without sound), and sensor data which may comprise data relating to vehicle characteristic and/or parameter data (e.g., from 102), and may also provide environmental data pertaining to the vehicle, its interior and/or surroundings, such as temperature, humidity and the like, and may further include LiDAR, radar, image processing, computer vision and other data relating to autonomous (or "automated") driving and/or assisted driving. Radio/entertainment circuitry 105 may provide data relating to audio/video media being played in vehicle 101. The radio/entertainment circuitry 105 may be integrated and/or communicatively coupled to an entertainment unit configured to play AM/FM radio, satellite radio, compact disks, DVDs, digital media, streaming media and the like. Communications circuitry 106 allows any of the circuitries of system 100 to communicate with each other and/or external devices (e.g., devices 202-203) via a wired connection (e.g., Controller Area Network (CAN bus), local interconnect network, etc.) or wireless protocol, such as 3G, 4G, 5G, Wi-Fi, Bluetooth, Dedicated Short Range Communications (DSRC), cellular vehicle-to-everything (C-V2X) PC5 or NR, and/or any other suitable wireless protocol. While communications circuitry 106 is shown as a single circuit, it should be understood by a person of ordinary skill in the art that communications circuitry 106 may be configured as a plurality of circuits. In one embodiment, circuitries 102-106 may be communicatively coupled to bus 112 for certain communication and data exchange purposes.

Vehicle 101 may further comprise a main processor 107 (also referred to herein as a "processing apparatus") that centrally processes and controls data communication throughout the system 100. The processor 107 may be configured as a single processor, multiple processors, or part of a processor system. In some illustrative embodiments, the processor 107 is equipped with autonomous driving and/or advanced driver assistance circuitries and infotainment circuitries that allow for communication with and control of any of the circuitries in vehicle 100. Storage 108 may be configured to store data, software, media, files and the like, and may include sensor data, machine-learning data, fusion data and other associated data, discussed in greater detail below. Digital signal processor (DSP) 109 may comprise a processor separate from main processor 107, or may be integrated within processor 107. Generally speaking, DSP 109 may be configured to take signals, such as voice, audio, video, temperature, pressure, sensor, position, etc. that have been digitized and then process them as needed. Display 110 may consist of multiple physical displays (e.g., virtual cluster instruments, infotainment or climate control displays). Display 110 may be configured to provide visual (as well as audio) indicial from any circuitry in FIG. 1, and may be a configured as a human-machine interface (HMI), LCD, LED, OLED, or any other suitable display. The display 110 may also be configured with audio speakers for providing audio output. Input/output circuitry 111 is configured to provide data input and outputs to/from other peripheral devices, such as cell phones, key fobs, device controllers and the like. As discussed above, circuitries 102-111 may be communicatively coupled to data bus 112 for transmitting/receiving data and information from other circuitries.

In some examples, when vehicle 101 is configured as an autonomous vehicle, the vehicle may be navigated utilizing any level of autonomy (e.g., Level 0-Level 5). The vehicle may then rely on sensors (e.g., 104), actuators, algorithms, machine learning systems, and processors to execute software for vehicle navigation. The vehicle 101 may create and maintain a map of their surroundings based on a variety of sensors situated in different parts of the vehicle. Radar sensors may monitor the position of nearby vehicles, while video cameras may detect traffic lights, read road signs, track other vehicles, and look for pedestrians. LiDAR sensors may be configured bounce pulses of light off the car's surroundings to measure distances, detect road edges, and identify lane markings. Ultrasonic sensors in the wheels may be configured to detect curbs and other vehicles when parking. The software (e.g., stored in storage 108) may processes all the sensory input, plot a path, and send instructions to the car's actuators, which control acceleration, braking, and steering. Hard-coded rules, obstacle avoidance algorithms, predictive modeling, and object recognition may be configured to help the software follow traffic rules and navigate obstacles.

Figure 2:
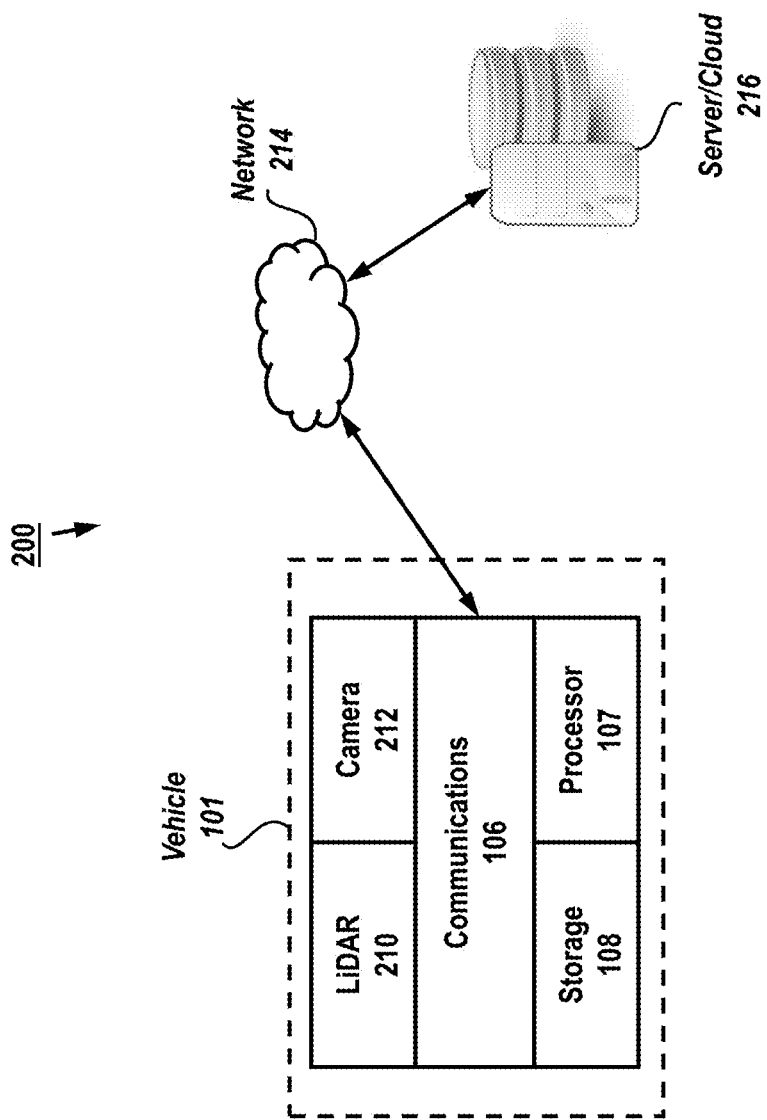
FIG. 2 shows an exemplary network environment illustrating communications between a vehicle and a server/cloud network according to some aspects of the present disclosure.

Turning to FIG. 2, the figure shows an exemplary network environment 200 illustrating communications between a vehicle 101 and a server/cloud network 216 according to some aspects of the present disclosure. In this example, the vehicle 101 of FIG. 1 is shown with storage 108, processing apparatus 107 and communications circuitry 106 that is configured to communicate via a network 214 to a server or cloud system 216. It should be understood by those skilled in the art that the server/could network 216 may be configured as a single server, multiple servers, and/or a computer network that exists within or is part of a cloud computing infrastructure that provides network interconnectivity between cloud based or cloud enabled application, services and solutions. A cloud network can be cloud based network or cloud enabled network. Other networking hardware configurations and/or applications known in the art may be used and are contemplated in the present disclosure.

Vehicle 101 may be equipped with multiple sensors, such as LiDAR 210 and camera 212, which may be included as part of the vehicle's sensor system (104), where LiDAR 210 produces LiDAR data for vehicle 101 operations, and camera 212 produces image data (e.g., video data) for vehicle 101 operations. The vehicle operations may include, but is not limited to, autonomous or semi-autonomous driving. The operational software for LiDAR 210 and/or camera 212 may be received via communications 106 from server/cloud 216 and stored in storage 108 and executed via processor 107. In one example, operational software for LiDAR 210 and/or camera 212 may alternately or in addition be loaded manually, e.g., via I/O 111. Depending on the application, the operational software may be periodically updated automatically and/or manually to ensure that the operating software conforms with the hardware components of the LiDAR 210 and/or camera 212.

When changing or modifying a sensor (e.g., LiDAR 210, camera 212), the vehicle operator is faced with the issue of going through full cycles of data collection, labeling, model training, integration and testing, etc. in order to ensure the new sensor(s) operate properly in the vehicle. Conventionally, the data associated with an old sensor is not largely applicable to a new sensor that is replacing it, particularly if the old sensor has inferior operating characteristics (e.g., low-resolution) compared to the new sensor (e.g., high-resolution). In the case of LiDARs, as mentioned above, each LiDAR sensor has different physical characteristics, based on the type of photon it emits, scanning patters, transmitter-receiver characteristics, etc. Thus, for a machine-learning model to transfer data from one sensor to another, it has to understand the structure of the objects visible in a point clouds to provide resolution in multiple scales, as well as understand the properties of each sensor.

In some examples, technologies and techniques are disclosed for utilizing image data from a camera (e.g., 212) to obtain higher-resolution depth signals for associated LiDAR data using fusion of color image data and LiDAR data. Encoders may be used to learn features from image data and (sparse) LiDAR data, wherein the LiDAR encoder is configured with a point cloud architecture. Instead of mapping point cloud data to an image, and then applying conventional convolutional neural network (CNN) models, a graph neural network (GNN) may be applied to work on the point cloud data. In a sense, aspects of the present disclosure may be considered an application of inpainting using Generative Adversarial Networks (GAN), wherein the adversarial training may provide more realistic dense LiDAR data from sparser data. Additionally, deep-learning attention mechanisms may be applied to further improve the output.

Turning to FIG. 3A, the drawing shows an exemplary block diagram 300A for applying machine learning models (306, 308) to LiDAR data 302 and image data 304 and fusing the results according to some aspects of the present disclosure. In this example, LiDAR data 302 (e.g., from LiDAR 210) is transmitted to a first machine-learning model 306, which processes the LiDAR data 302 to determine LiDAR characteristics of interest and transmits the output to fusion block 310. Image data 304 (e.g., from camera 212) is transmitted to a second machine-learning model 308, which processes the image data 304 to determine image characteristics of interest and transmits the output to fusion block 310. As will be discussed in greater detail below, the fusion block 310 then processes the LiDAR and image characteristics of interest together to produce an output 318 that may be transmitted to a discriminator 312 (e.g., a GAN discriminator) that compares the fused output with base data 314 (e.g., ground truth data) to generate a verified output 316. In one example, the output of fusion block 310 may be a generated high-resolution depth LiDAR image that was produced from fusing, e.g., color image and depth data, and transmitted to the discriminator 312. The discriminator 312 then compares the fusion block 310 output data 318 with base data 314, which in this example, includes ground truth high resolution depth data.

In some examples, the discriminator 312 may be configured with generative modeling to enable unsupervised learning tasks via machine learning to automatically discover and learn regularities or patterns in input data from the fusion block 310 in such a way that the generative model can be used to generate or output LiDAR data that is drawn from the original dataset (e.g., 302, 304). The GAN configuration may be used to train a generative model by framing the problem as a supervised learning problem with a plurality of sub-models, including the fusion block 310 (generator model) that is trained to generate new LiDAR data, and the discriminator model (e.g., 312) that classifies data as either real (from the same LiDAR domain) or false (from a different LiDAR domain). The two models may be trained together in an adversarial, zero-sum configuration, until the discriminator model recognizes plausible outputs (e.g., output from the fusion block 310 is sufficiently similar to base data 314 associated with a better-featured LiDAR).

In some examples, machine-learning model 306 may be configured as a graph neural network (GNN), such as a point feature generation graph network. Those skilled in the art will recognize that other suitable machine-learning algorithms may be utilized, depending on the sensor application. The GNN of machine-learning model 306 should be configured differently from conventional neural networks, such as convolutional neural network (CNN), recurrent neural network (RNN), etc., as these types of networks typically cannot handle a graph input properly, in that they stack the feature of nodes by a specific order. Given that there often isn't a natural order of nodes in a graph, all the possible orders of a graph may need to be traversed as the input of the CNN/RNN model, which is very redundant when computing. Conversely, the GNN of machine-learning model 306 may propagate on each node respectively, and may ignore the input order of nodes. In other words, the output of GNN may be invariant for the input order of nodes.

Additionally, an edge in a graph may represent the information of dependency between two nodes. In standard neural networks, the dependency information is just regarded as the feature of nodes. However, the GNN of machine-learning model 306 can be configured to do propagation guided by a graph structure instead of using it as part of features. Generally, the GNN may update the hidden state of nodes by a weighted sum of the states of a neighborhood. Furthermore, while standard neural networks may be able to generate synthetic images and data by learning the distribution of data, they are not typically configured to learn the reasoning graph from large experimental data. In contrast, the GNN of machine-learning model 306 may be configured to generate a graph from non-structural data like scene pictures, which can be a particularly effective neural model for further high-level machine learning.

In some examples, machine-learning model 308 may be configured as a two-dimensional (2D) CNN for obtaining appearance features from the image data 304. Those skilled in the art will recognize that other suitable machine-learning algorithms may be utilized, depending on the camera/sensor application. Generally speaking, the two-dimensional CNN may utilize convolution utilizing a kernel (e.g., a matrix of weights), where the kernel may be configured to "slide" over the 2D input data, performing an elementwise multiplication with the part of the input it is currently on, and then summing up the results into a single output pixel. The kernel repeats this process for every location it slides over, converting a 2D matrix of features into yet another 2D matrix of features. The output features are essentially the weighted sums, with the weights being the values of the kernel itself, of the input features located approximately in the same location of the output pixel on the input layer.

When utilizing point feature generation, the convolutional graph neural network (306) may capture geometric dependencies from points in three-dimensional space by applying convolution (e.g., spectral kernels) on a neighborhood surrounding points. The three-dimensional points may then be projected to an empty two-dimensional feature map, where point features may be assigned to corresponding projected pixels. Using such techniques, a two-dimensional feature map may be obtained as the output of the three-dimensional sub-network. In some examples, the output may have the same shape as the outputs of the two-dimensional sub-network. Accordingly, a cross-modal transformation (e.g., from LiDAR-to-image, and/or image-to-LiDAR) may be carried out, where features of interest may be concatenated and corresponded to each frame of a video/LiDAR or patches of an image.

Figure 3B:
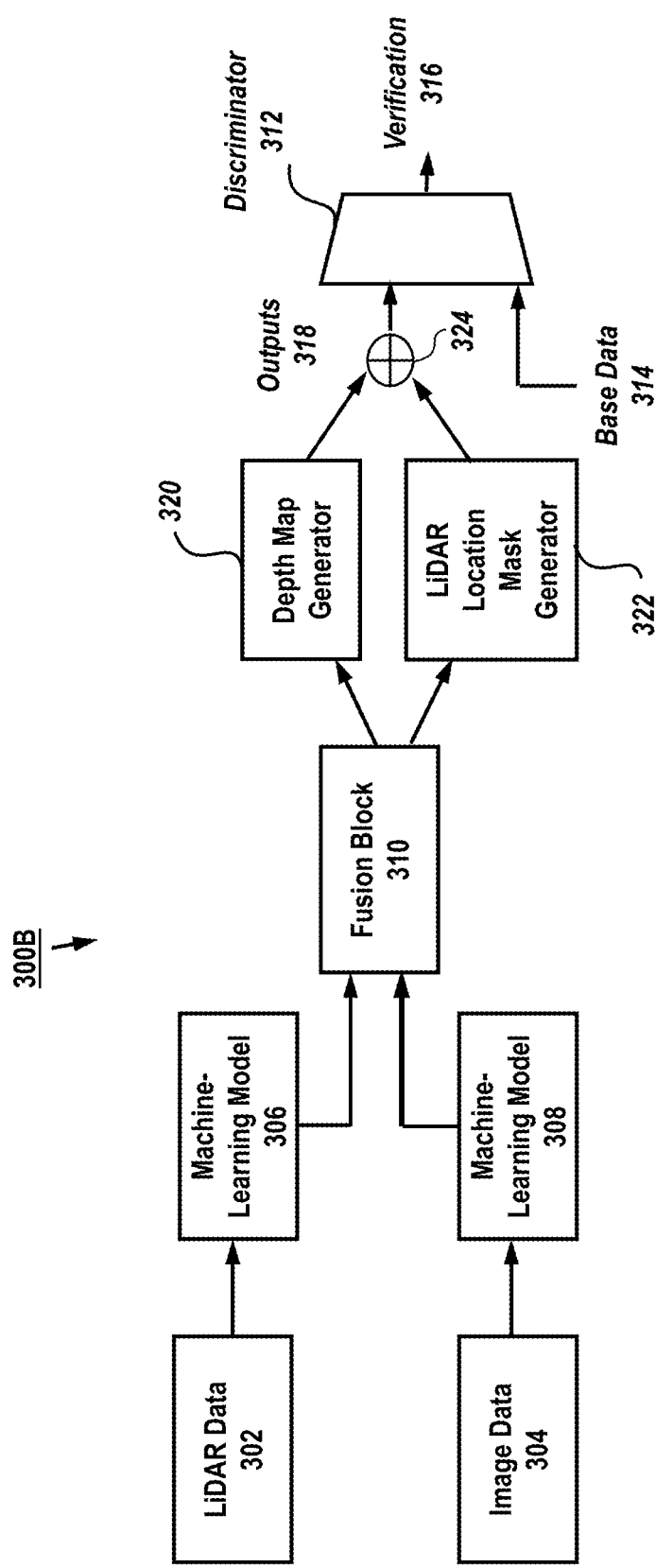
FIG. 3B shows an exemplary block diagram for applying machine learning models to LiDAR data and image data and fusing the results, wherein the fused data is processed with a depth map generator and a LiDAR location mask generator according to some aspects of the present disclosure.

FIG. 3B shows an exemplary block diagram 300B for applying machine learning models to LiDAR data and image data and fusing the results, wherein the fused data is processed with a depth map generator and a LiDAR location mask generator according to some aspects of the present disclosure. The block diagram 300B of FIG. 3B represents similar features and components (302-318) as described above in connection with FIG. 3A, except that the output of fusion block 310 is processed with a depth map generator 320, and LiDAR location mask generator 322, wherein the outputs 318 of both are combined in function block 324 and provided to the discriminator 312 for verification. During operation, the fusion block 310 learns encoded features (representation) from the LiDAR data (302, 306) and image data (304, 308) during fusion. The LiDAR data may be configured to have multiple values including, but not limited to, data point locations and depth value of the points. In some examples, instead of generating the multiple values in one map, the fusion block 310 may be trained to generate a plurality of maps. In this example, the decoder may be split to generate two maps, based on the depth map generator 320 and LiDAR location mask generator 322.

The LiDAR location map generator 322 may be configured generate mask values to identify LiDAR points. In a simplified example, the LiDAR location map generator 322 may be configured to generate a "0" to indicate no LiDAR points in the data location, and a "1" to indicate the presence of LiDAR points in the data location. The depth map generator 320 may be configured to assign one or more values to points or pixels in a scene, similar to a heat map. The depth map generator 320 may generate a dense map from the values. The outputs of the depth map generator 320 and LiDAR location mask generator 322 may be combined (e.g., multiplied) in function block 324 (e.g., mask and depth map) to get a final lidar output representing a target LiDAR. In the simplified example, locations having a "0" mask value from LiDAR location mask generator 322 would result in a "0" target lidar output, while locations having a "1" mask value from LiDAR location mask generator 322 would produce estimated depth values from the predicted depth map from depth map generator 320. Those skilled in the art will appreciate that other configurations of block diagram 3B are contemplated in the present disclosure.

Figure 4:
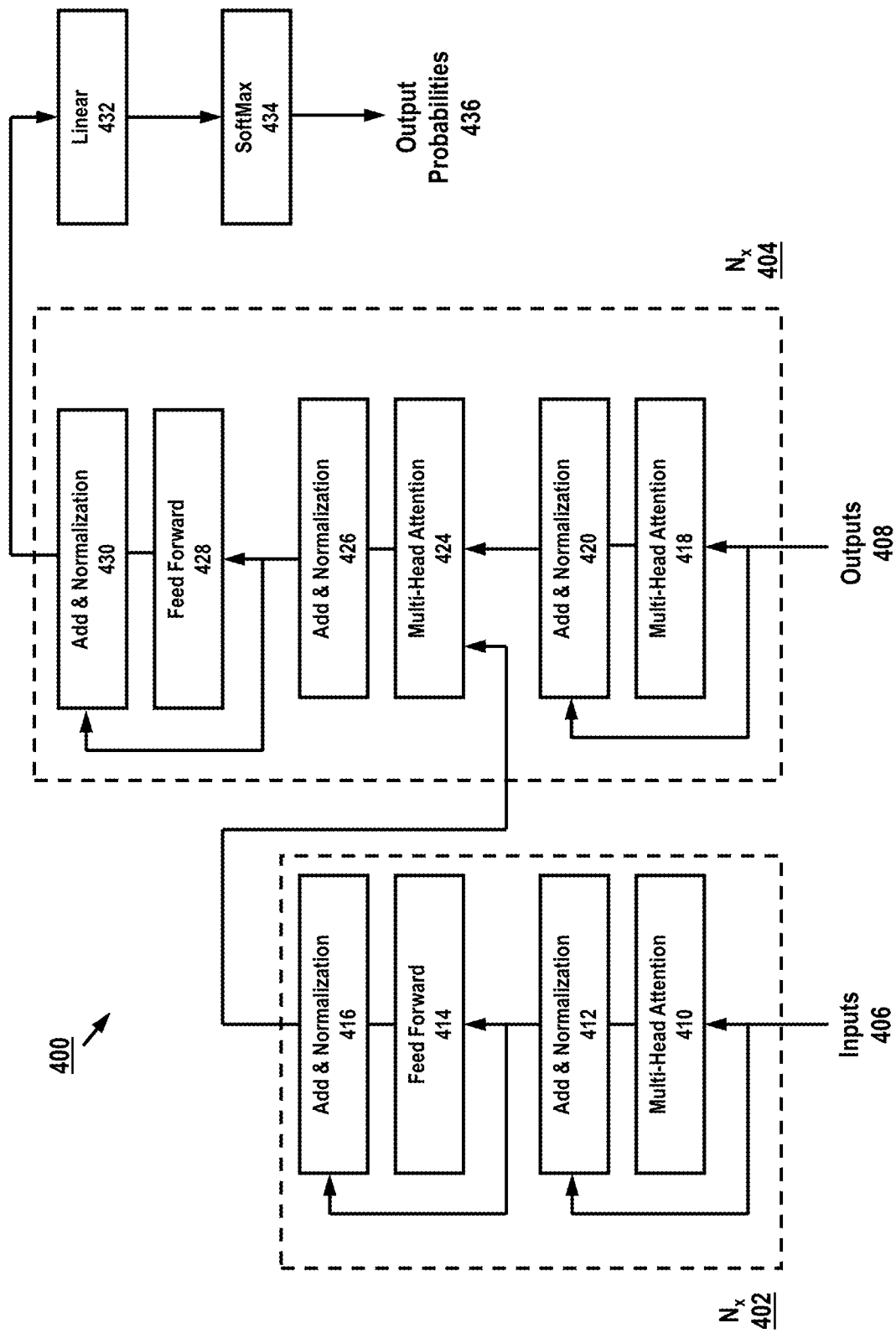
FIG. 4 shows an exemplary block diagram for an encoder-decoder configuration for applying an attention mechanism to data under some aspects of the present disclosure.

FIG. 4 shows an exemplary block diagram 400 for an encoder-decoder configuration for applying an attention mechanism to data under some aspects of the present disclosure. In this example, the block diagram 400 illustrates a basic attention mechanism that may be applied for fusing data, for example, via fusion block 310. In some examples, self-attention, also known as intra-attention, is an attention mechanism relating different positions of a single sequence, in order to compute a representation of the sequence. A competitive neural sequence transduction models may be configured with an encoder-decoder structure, where the encoder maps an input sequence of symbol representations to a sequence of continuous representations. Given a continuous representation, the decoder may then generate an output sequence of symbols one element at a time. At certain steps, the model may be configured to be auto-regressive, consuming the previously-generated symbols as additional input when generating the next.

In some examples, the encoder 402 may be configured with a stack ($N_x$) of layers, where each layer has a plurality (e.g., two) of sub-layers (e.g., 410-412, 414-416). In some examples, encoder input 406 may be subjected to embedding and/or positional encoding, wherein the input is provided to multi-head attention block 412 and addition and normalization block 412. A residual (or short-circuit) connection (shown as arrow looping from input 406 to block 412) may also be provided under some examples. The input may include queries (Q) keys (K) and values (V) that are mapped into lower-dimension vector space using weight matrices, and the results may then be used to computer attention, where the output may be referred to as a "head". The output of block 412 is then forwarded to another sub-layer that may include feed-forward block 414 and addition and normalization block 416. A residual connection (shown as arrow looping from output of 412 to block 416) may also be provided under some examples. The output of addition and normalization block 416 may then be forwarded to multi-head attention block 414 of the decoder 404 as shown in the figure.

The encoder 402 may thus be configured with a stack ($N_x$) of a plurality of layers, each having a plurality of sub-layers. One of the layers may be configured as a multi-head self-attention mechanism (410-412), and another layer (414-416) may be configured as a position-wise, fully connected feed-forward network. A residual connection may be provided around each of the sub-layers (410-412, 414-416), followed by layer normalization. In other words, an output from each sub-layer may be expressed as LayerNorm(x+sub-layer(x)), where sub-layer (x) represents the function implemented by the sub-layer itself. To facilitate the residual connections, the sub-layers in the model, as well as the embedding layers, may produce outputs of a configured dimension (d).

The decoder 404 may be also configured with a stack (Nx) of a plurality of layers, where the multi-head attention block 418, addition and normalization block 420 may be similar to blocks 410, 412 of the encoder 402, and may be configured to perform masked decoder self-attention on previously generated outputs. As discussed above, multi-head attention block 424 receives the output of block 416 that includes R, V and may include Q from previous decoder layer, where addition and normalization block 426 is used to form a second sub-layer for decoder 404. A further sub-layer may be configured with feed-forward block 428 and addition and normalization block 430. This sub-layer may be configured to perform multi-head attention over the output of the encoder (402) stack. Similar to the encoder, the decoder may utilize residual connections around each of the sub-layers as shown, followed by layer normalization. The output of block 430 may then be transmitted to the linear transformation block 432 and SoftMax function block 434 to convert the decoder (404) output to predicted next-token probabilities 436.

Figure 5:
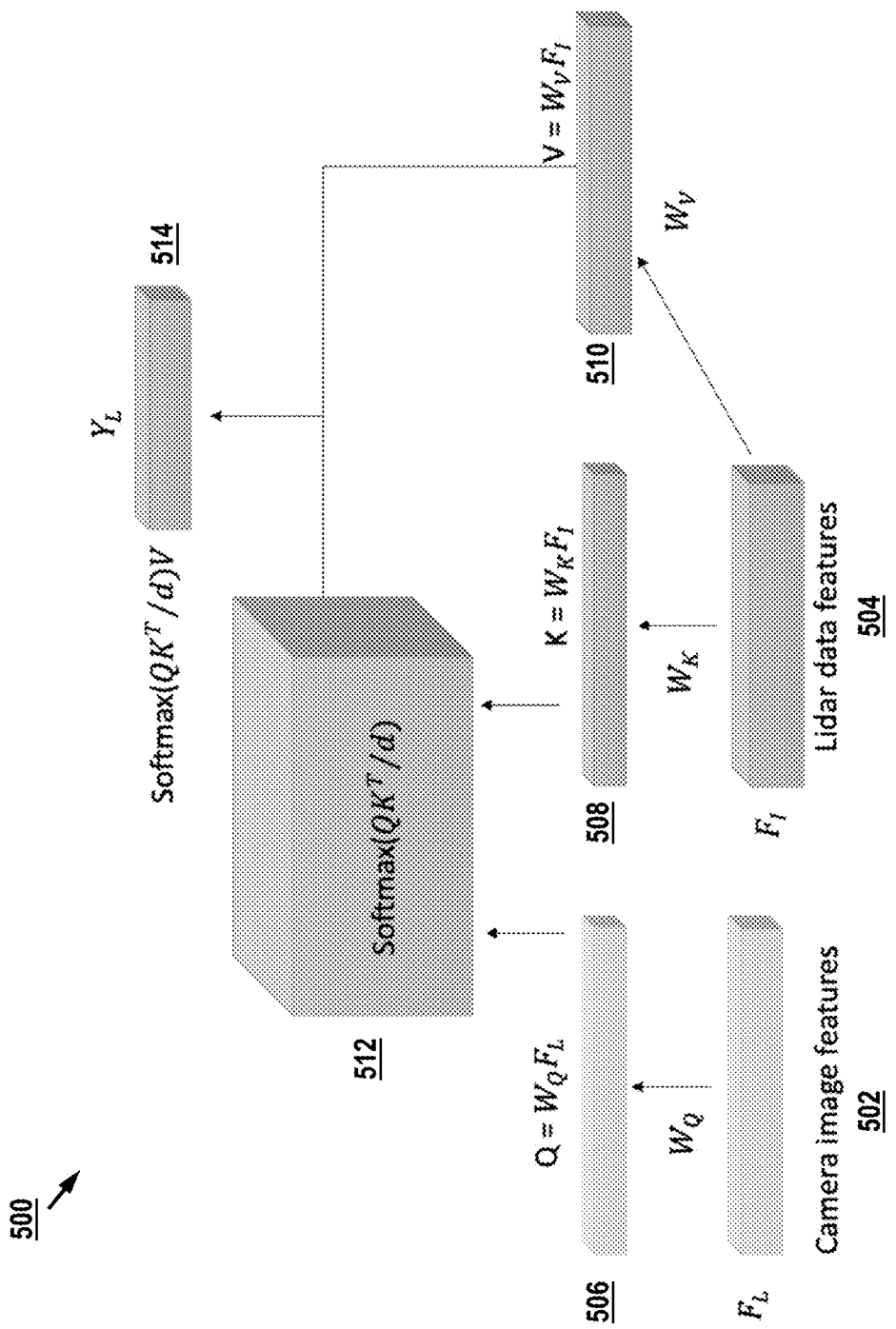
FIG. 5 shows another exemplary data processing environment for fusing camera image features and LiDAR data features utilizing an attention mechanism under some aspects of the present disclosure.

FIG. 5 shows an exemplary data processing environment 500 for fusing camera image features 502 and LiDAR data features 504 utilizing an attention mechanism under some aspects of the present disclosure. The data processing environment 500 illustrates fusing of sensor modalities using attention mechanism machine-learning techniques. As used herein, "modality" may refer to a sensor domain, such as a LiDAR or camera, where each represents a different domain, or modality. In one example, the data processing environment 500 may be utilized in the fusion block 300 of the example of FIG. 3, where a plurality of modalities (I, L), associated a camera image (302) and LiDAR (304) data, are configured to include feature vectors $F_I$ 504 and $F_L$ 502 that are learned during a training process, similar to decoder transformer process used in language models. In this example, cross-modal information may be fused (e.g., via fusion block 310) having a latent adaptation across modalities, as shown in the figure.

During operation, queries ($Q$), keys (K) and values (V) are obtained, where $Q=W_Q F_I$ (506), $K=W_K F_L$ (508) and $V=W_V F_L$ (510), where W designates weight matrices learned during training. Thus, given a query $Q$ and a set of key-value pairs (K, V), attention can be generalized to compute a weighted sum of the values dependent on the query and the corresponding keys. As in the example of FIG. 5, the query determines which values to focus on, which in turn 'attends' to the values, and the latent adaptation from image to lidar may be configured as the cross-modal attention. A SoftMax function may be performed in block 512 on $Q$ and K outputs from blocks 506, 508, represented as SoftMax($Q K^T/d$) and another SoftMax function may be applied in block 514 using the output of block 512 and the V output of block 510, represented as SoftMax($Q K^T/d$)V. The SoftMax functions are configured to score the SoftMax matrix, whose (i, j)-th entry measures the attention given by the i-th item of a first modality (e.g., camera), to the j-th entry of second modality (e.g., LiDAR). Performing adaptation from low-level feature in such a manner improves the model for keeping low-level information for each modality. The output $Y_L$ corresponds to cross-modal attention produced from camera data to LiDAR data.

It should be understood by those skilled in the art that the technologies and techniques described herein may be applied in any suitable manner, depending on the specific sensor application. For example, instead of producing cross-modal attention from camera data to LiDAR data, similar processes may be utilized to produce cross-modal attention from LiDAR data to camera data. Furthermore, additional sensor platforms that produce sensor data suitable for cross-modal attention is contemplated in the present disclosure.

Figure 6:
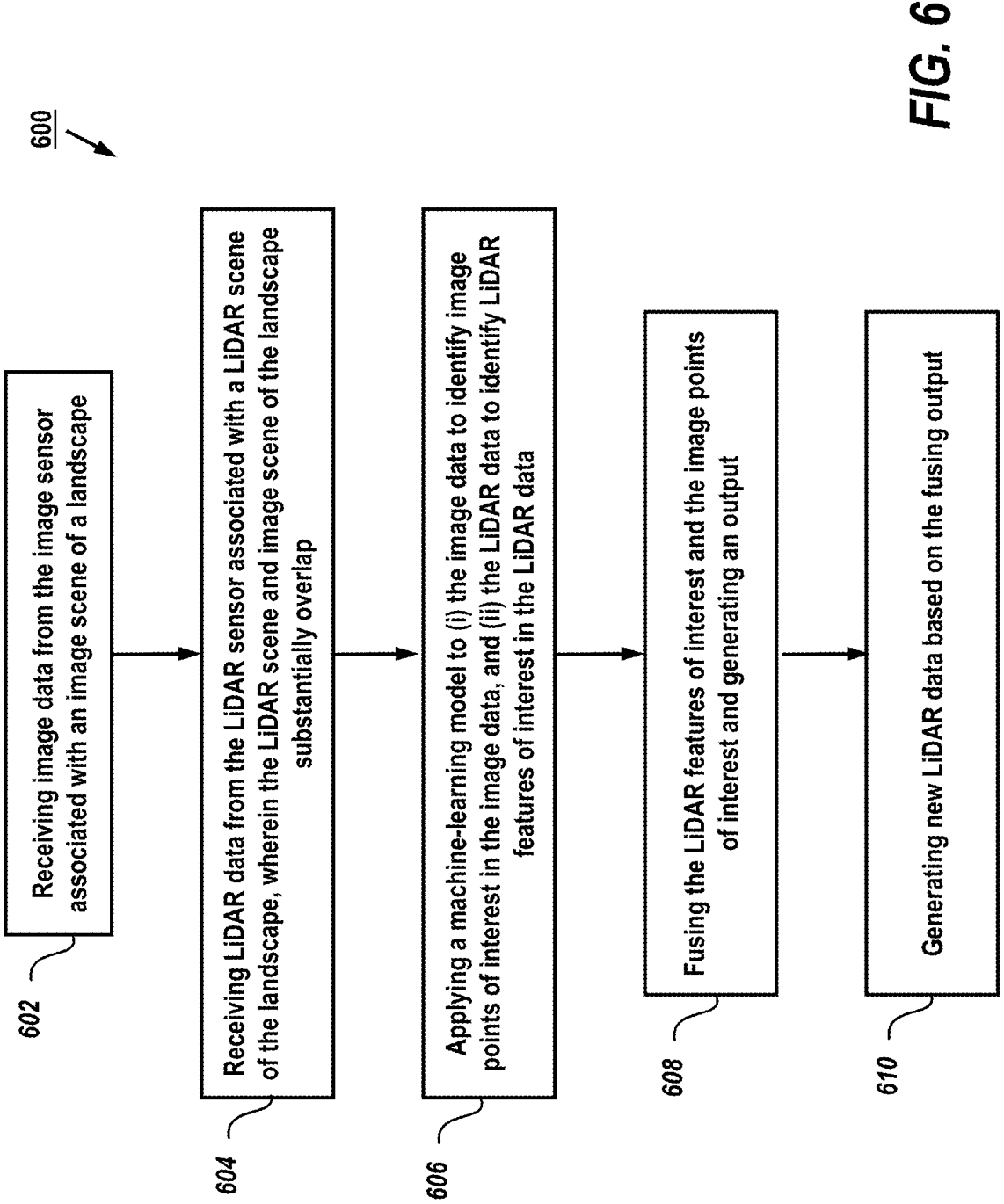
FIG. 6 shows an exemplary process flow for generating new sensor data resulting from the fusion of first and second sensor data under some aspects of the disclosure.

FIG. 6 shows an exemplary process flow 600 for generating new sensor data (e.g., fused sensor data) resulting from the fusion of first and second sensor data (e.g., 302, 304) under some aspects of the disclosure. In block 602, an input may receive image data from an image sensor (e.g., 212) associated with an image scene of a landscape (e.g., field of view of a vehicle 101). In block 604, LiDAR data is received from the LiDAR sensor (e.g., 210) associated with a LiDAR scene of the landscape, wherein the LiDAR scene and image scene of the landscape substantially overlap. In some examples, the overlapping of the image data and the LiDAR data indicates the two sensors are viewing the same landscape (e.g., both are view the substantially same scene). In block 606 a machine-learning model is applied to (i) the image data to identify image features of interest (e.g., points of the image data) in the image data, and (ii) the LiDAR data to identify LiDAR features of interest in the LiDAR data. In block 608, the LiDAR features of interest and the image points of interest are fused and an output is generated. In block 610, new LiDAR data is generated based on the fusing output (e.g., output 318 of fusion block 310).

Figure 7:
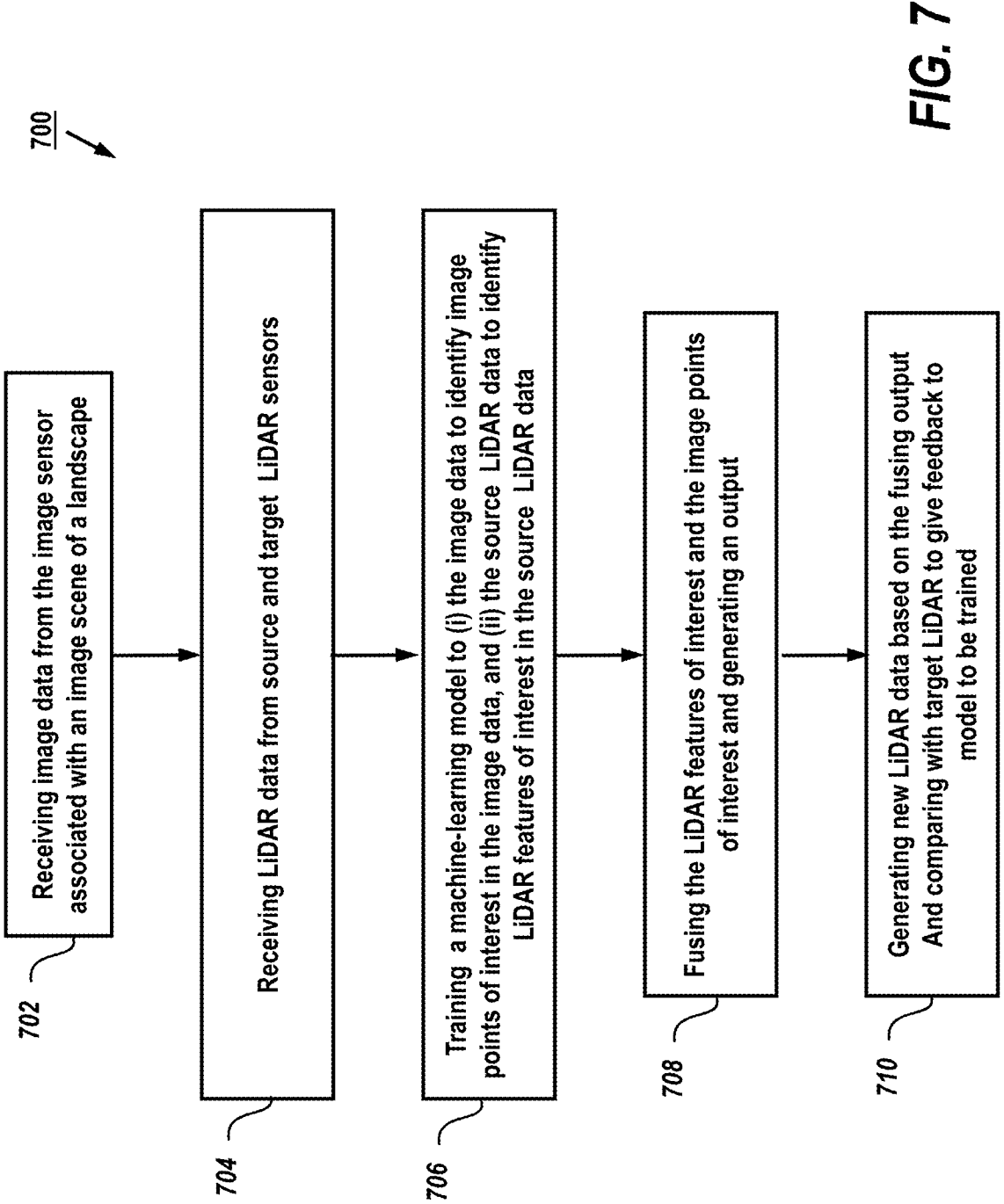
FIG. 7 shows an exemplary process flow for training a machine-learning device to produce new sensor data resulting from the fusion of first and second sensor data under some aspects of the disclosure.

FIG. 7 shows an exemplary process flow 700 for training a machine-learning device and/or model (e.g., 306, 308) to produce new sensor data resulting from the fusion of first and second sensor data under some aspects of the disclosure. In block 702, an input may receive image data (e.g., 304) from the image sensor associated with an image scene of a landscape. In block 704, an input may receive LiDAR data (e.g., 302, 314) from source and target LiDAR sensors, where the LiDAR data may be from a same scene (e.g., using pix2pix), or different scenes (e.g., using CycleGan). In block 706, a processor and memory may train a machine-learning device and/or model (e.g., 306, 308) to (i) the image data to identify image points of interest in the image data, and (ii) the source LiDAR data to identify LiDAR features of interest in the source LiDAR data. In block 708 a fusion block (e.g., 310) may fuse the LiDAR features of interest and the image points of interest as described above and generate an output. In block 708, new LiDAR data may be output based on the fusing output. Alternately or in addition, the new LiDAR data may be compared with target LiDAR data to give feedback to the model to be trained.

Figure 8:
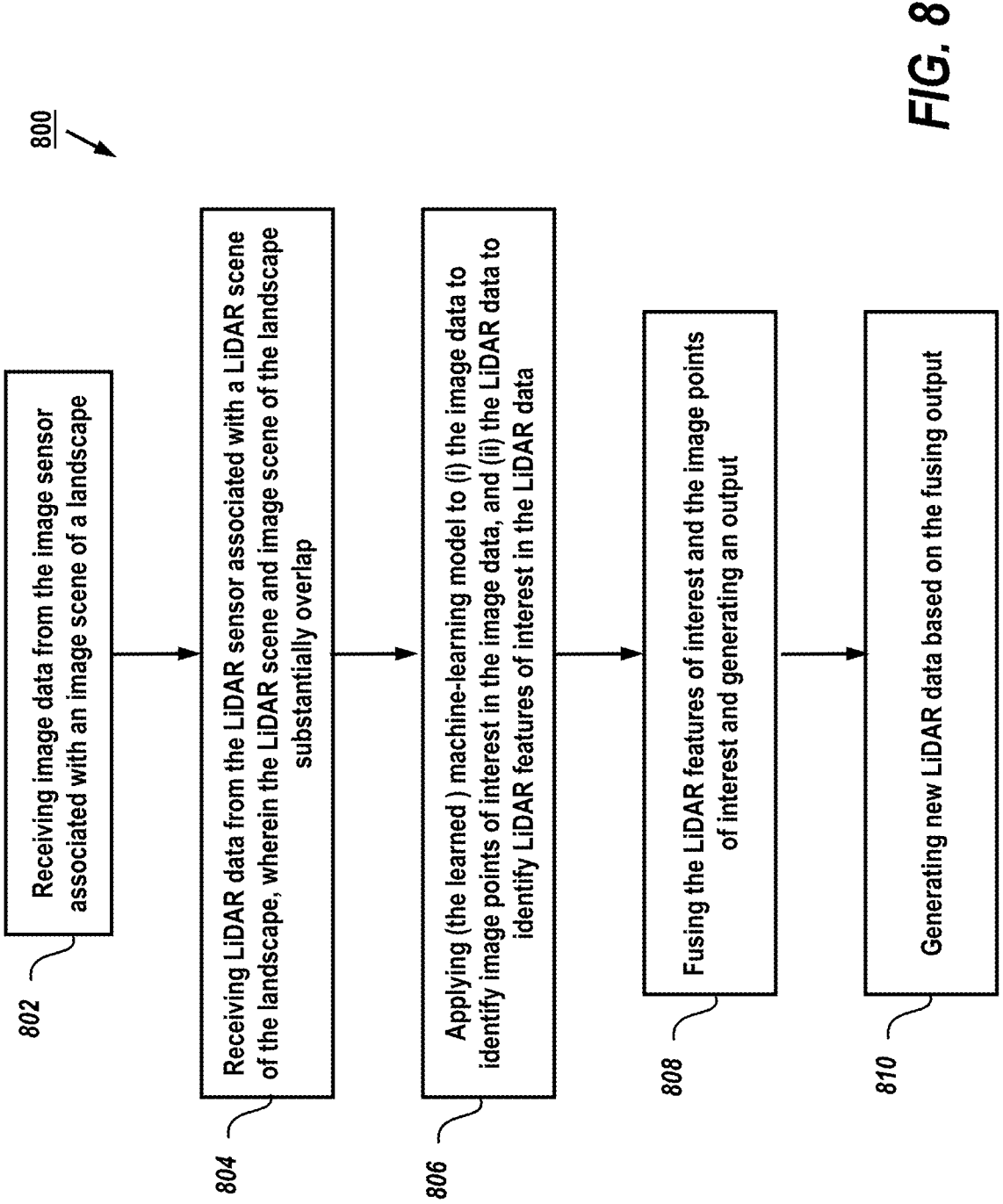
FIG. 8 shows an exemplary process flow for operating new sensor data resulting from the fusion of first and second sensor data during deployment under some aspects of the disclosure.

FIG. 8 shows an exemplary process flow for 800 operating new sensor data resulting from the fusion of first and second sensor data during deployment under some aspects of the disclosure. In block 802, an input may receive image data (e.g., 304) from the image sensor associated with an image scene of a landscape. In block 804, an input may receive LiDAR data (e.g., 302, 314) from the LiDAR sensor associated with a LiDAR scene of the landscape, wherein the LiDAR scene and image scene of the landscape substantially overlap. In block 806, a processor and memory may apply (the learned) machine-learning model to (i) the image data to identify image points of interest in the image data, and (ii) the LiDAR data to identify LiDAR features of interest in the LiDAR data. In block 808 a fusion block (e.g., 310) may fuse the LiDAR features of interest and the image points of interest as described above and generate an output. In block 810, new LiDAR data may be output based on the fusing output.

Using the technologies and techniques disclose herein, cross-modal sensors (e.g., sensors based on different modalities/domains, such as cameras and LiDARs) may be fused to provide improved outputs. Using simulation, corresponding pairs of LiDAR sensors (e.g., existing sensor and upgraded target sensor), along with registered RGB camera views and associated segmentation labels may be used to improve sensor function. During initial operation, test cars may be used to evaluate and benchmark sensors to collect data from both sensors, as well as calibrate and register the sensors with respect to each other. Such an approach may assist in perspective transformation of point clouds from one 3D coordinate space to another so, the resulting configuration may be used as input and output during the training process. The present disclosure addresses aspects of collecting data needed for training a generative machine learning model that learns to do cross-sensor translation of, for example, LiDAR sensor data using self-supervised machine learning techniques. Technologies and techniques are also disclosed for leveraging both camera and LiDAR modalities to generate LiDAR point clouds as if they are being generated out of a different (e.g., higher-resolution) sensor. Once a model is trained, it can be used a replacement for the otherwise expensive sensor in production vehicles. Conventional approaches often use full depth maps as target ground truth which is computed (i.e., estimated) from disparity from stereo cameras, followed by a manual labeling effort. These approaches is both costly and introduce errors, since results are based on estimated, rather than measured, data.

As described above, some or all illustrated features may be omitted in a particular implementation within the scope of the present disclosure, and some illustrated features may not be required for implementation of all examples. In some examples, the methods and processes described herein may be performed by a vehicle (e.g., 101), as described above and/or by a processor/processing system or circuitry (e.g., 102-111, 210, 212) or by any suitable means for carrying out the described functions.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of operating a sensor system comprising an image sensor and a light detection and ranging (LiDAR) sensor, comprising:
   receiving image data from the image sensor associated with an image scene of a landscape;
   receiving LiDAR data from the LiDAR sensor associated with a LiDAR scene of the landscape, wherein the LiDAR scene and image scene of the landscape overlap;
   applying one or more machine-learning models to (i) the image data to identify image features of interest, and to (ii) the LiDAR data to identify LiDAR features of interest;
   fusing features of the LiDAR features of interest and the image features of interest; and
   generating LiDAR data based on the fused features, wherein the generated LiDAR data has a depth map and a LiDAR location mask representative of the landscape.

2. The method of claim 1, wherein the machine-learning model comprises a two-dimensional deep neural network.

3. The method of claim 2, wherein the machine-learning model further comprises a point feature generation graph network.

4. The method of claim 1, wherein the fusing of the LiDAR features of interest and the image features of interest comprises applying an attention function by mapping a query vector and one or more sets of key-value pair vectors to the output.

5. The method of claim 4, wherein the output comprises a weighted sum of values, wherein the weights assigned to each value is computed as a compatibility function of the query vector with a corresponding key vector.

6. The method of claim 5, further comprising concatenating the weighted sum of values of the output.

7. The method of claim 1, further comprising applying a loss function to the output to determine the accuracy of the output.

8. The method of claim 7, wherein applying the loss function comprises applying a generative adversarial network (GAN) discriminator to the output, relative to ground truth data associated with another LiDAR sensor.

9. A sensor system comprising an image sensor and a light detection and ranging (LiDAR) sensor, comprising:
   a first input for receiving image data from the image sensor associated with an image scene of a landscape;
   a second input for receiving LiDAR data from the LiDAR sensor associated with a LiDAR scene of the landscape, wherein the LiDAR scene and image scene of the landscape overlap;
   a memory, coupled to the input for storing the first sensor data; and
   a processor, operatively coupled to the memory, wherein the processor and memory are configured to
      apply one or more machine-learning models to (i) the image data to identify image features of interest, and to (ii) the LiDAR data to identify LiDAR features of interest,
      fuse features of the LiDAR features of interest and the image features of interest, and
      generate LiDAR data based on the fused features, wherein the generated LiDAR data has a depth map and a LiDAR location mask representative of the landscape.

10. The system of claim 9, wherein the machine-learning model comprises a two-dimensional deep neural network.

11. The system of claim 10, wherein the machine-learning model further comprises a point feature generation graph network.

12. The system of claim 9, wherein the processor and memory are configured to fuse the LiDAR features of interest and the image points of interest by applying an attention function by mapping a query vector and one or more sets of key-value pair vectors to the output.

13. The system of claim 12, wherein the output comprises a weighted sum of values, wherein the weights assigned to each value is computed as a compatibility function of the query vector with a corresponding key vector.

14. The system of claim 13, wherein the processor and memory are configured to concatenate the weighted sum of values of the output.

15. The system of claim 9, wherein the processor and memory are configured to apply a loss function to the output to determine the accuracy of the output.

16. The system of claim 15, wherein the processor and memory are configured to apply the loss function by applying a generative adversarial network (GAN) discriminator to the output, relative to ground truth data associated with another LiDAR sensor.

17. A method of operating a sensor system comprising an image sensor and a light detection and ranging (LiDAR) sensor, comprising:
   receiving image data from the image sensor associated with an image scene of a landscape;
   receiving LiDAR data from the LiDAR sensor associated with a LiDAR scene of the landscape, wherein the LiDAR scene and image scene of the landscape overlap;
   applying one or more machine-learning models to (i) the image data to identify image features of interest in the image data, and (ii) the LiDAR data to identify LiDAR features of interest in the LiDAR data;
   fusing the LiDAR features of interest and the image points of interest, utilizing an attention mechanism, and generating an output; and
   generating new LiDAR data based on the fusing output, wherein the generated new LiDAR data comprises a depth map and a LiDAR location mask representative of the landscape.

18. The method of claim 17, wherein the machine-learning model comprises a two-dimensional deep neural network.

19. The method of claim 18, wherein the machine-learning model further comprises a point feature generation graph network.

20. The method of claim 17, wherein the attention mechanism comprises mapping a query vector and one or more sets of key-value pair vectors to the output.

* * * * *